Nov. 21, 1967 N. H. SCOTT ETAL 3,353,713

SYSTEM FOR CHARGING SMALL QUANTITIES OF GRANULAR MATERIALS

Filed March 2, 1966

INVENTORS:
Norman H. Scott
Kenneth D. Vesely
BY:
James R. Hoatson Jr.
Philip T. Liggett
ATTORNEYS United States Patent Office 3,353,713
Patented Nov. 21, 1967

3,353,713
SYSTEM FOR CHARGING SMALL QUANTITIES OF GRANULAR MATERIALS
Norman H. Scott, Villa Park, and Kenneth D. Vesely, La Grange Park, Ill., assignors to Universal Oil Products Company, Des Plaines, Ill., a corporation of Delaware
Filed Mar. 2, 1966, Ser. No. 531,202
8 Claims. (Cl. 222—57)

ABSTRACT OF THE DISCLOSURE

Granular solids dispensing apparatus comprising a balance beam supporting, at one end thereof, a solids feeder, including a feed hopper and a feeder means such as a vibrating table feeder or star feeder, and supporting, at the other end thereof, a liquid container from which a controlled rate of liquid is withdrawn. The feeder means is operated by a suitable actuator, such as an electric switch, positioned to be responsive to balance beam movement whereby the feed means is operated responsive to a greater weight on the feeder side of the balance. Rate of liquid outflow from the one end of the balance beam controls rate of solids outflow from the other end. The apparatus is periodically reloaded by simultaneously refilling the feed hopper and liquid container with granular solids and liquid, respectively.

---

Figure 1:
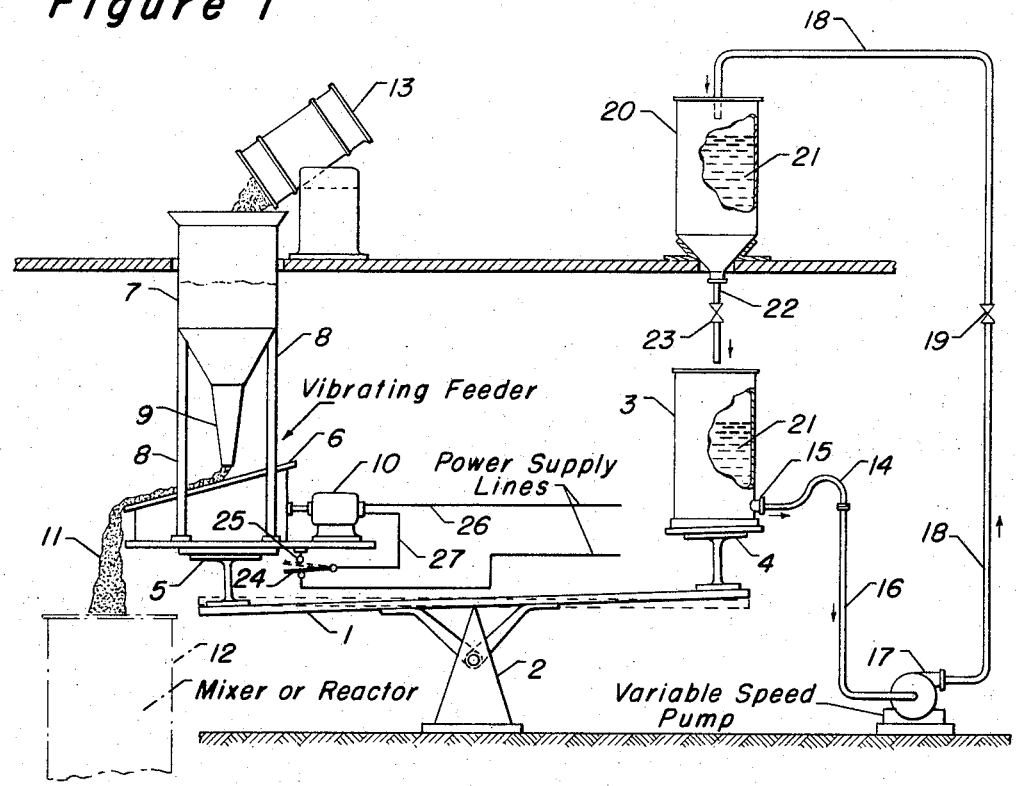

The present invention relates to a system for effecting the feeding of small quantities of a granular material into a mixing or processing zone. Basically, there is provided a controlled liquid flow rate to in turn regulate a solids charge rate from a supply zone into a mixing or reaction zone.

More specifically, there is utilized a closely controllable flow rate in a separate liquid flow system to regulate particle flow from a mechanical feeder-hopper system, with the fluid system being supported from one part of a balance beam and the feeder means held on the other end of the balance. Still further, a preferred arrangement utilizes actuating or switching means to effect the operation of the feeder means responsive to a change in the position or a movement of the balance beam.

There are various types of commercially available feeders and feeding mechanisms which can be used to obtain a more or less steady-state flow of fluid materials into a processing chamber or zone. The selection of a suitable feeder depends to some degree upon the nature of the material to be handled, i.e. as to whether it is free-flowing, sticky, lumpy, or a combination of physical properties. Also, the type of feeder may well depend upon other factors, such as the overall tonnage to be handled, the constant or intermittent feed requirements, the accuracy of feeding, and the like. By way of example, there are screw-conveyor feeders, under-cut and lifting-gate feeders, adjustable-gate roll feeders, rotary-paddle or "star" feeders, shaking or vibrating table feeders, etc. However, where it is desired to have extreme accuracy in feeding a subdivided material into a reaction zone, it has been found that the conventional forms of feeder means are generally unsatisfactory. For instance, there are catalyst manufacturing procedures which require a quite accurate measurement or introduction of granular solids into a mixing or reaction zone such that there is uniformity obtained in the resulting catalytic composite.

It is thus a desired object of the present invention to utilize a separate liquid flow or pump-around system to provide for the accurate weighing and control feeding of a granular material into a processing zone. It is a further object of this invention to utilize the movement of the balancing beam extending between the liquid flow system and the materials feeder unit to control the operation of the latter to in turn effect a controlled flow of solids therefrom.

In a broad aspect, the present apparatus system for discharging small quantities of granular solids material by the use of a controlled liquid flow rate from a separate liquid container, comprises in combination, a power operated feeder means positioned in association with a superposed feed hopper having a reduced area lower particle outlet therefrom, a balance beam with a deck means at one end thereof holding said feeder means, an opposing deck means for said balance beam holding a liquid retaining container for in turn maintaining a balancing weight for the feeder means, a liquid flow line and pump means connecting with said container for removing liquid therefrom at a controlled rate, and actuator means for operating said feeder means positioned adjacent to and in combination with the balancing beam, whereby such feeder means will remain operative responsive to a greater weight on the feeder side of said balance beam.

As used herein, the term "granular" with respect to the solids material, may include various forms or types of subdivided solid particles, including uniformly or irregularly shaped pellets, spherical particles, granular particles of uniform or non-uniform size, powders that are substantially free flowing, and various types of crushed materials, as long as such materials, are capable of being relatively free-flowing under the action of the feeder means being used. Actually, the feeder may be a vibrating type feeder, a screw feeder, a star feeder, a belt feeder, or any other easily regulated type and it is not intended to limit the present invention to any one type of feeder unit. There may be utilized a separate superposed feed hopper in combination with the feed unit itself, as for example a vibrating table form of feeder such that there is maintained a flow of material from the hopper and from the end of the shaking table responsive to movement of the latter. Alternatively, there may be utilized a hopper with one of the paddle or star feeders or, optionally, any one of the various types of commercially available vibrating-feeder units which integrate a feed hopper directly on or with a vibrating base such that there is a discharge of solids material from the unit at a uniform rate responsive to the operation of the vibrating section.

Rather than depend on adjustment of a gage, or other outlet means from a vibrating-feeder unit, or adjustment of speeds for a belt, screw, paddle, etc., to in turn effect the solids discharge, the present system utilizes a liquid flow rate from a container to balance and control the solids flow rate. A liquid flow rate can be very closely controlled by suitable pumping means of a variable rate positive displacement type, or by suitable orifice and valve control means in the discharge piping system of a centrifugal pump. A preferred system also incorporates a flow meter in the liquid discharge line so as to provide flow rate measurement and a means for accomplishing close control of the discharge rate. Thus, in effecting a balance of the feeder unit with a liquid container unit which will connect to a controlled liquid discharge means, the overall system can readily be made to operate automatically and provide a fairly continuous solids discharge operation, particularly with electrical switching means operating the feeder means.

Reference to the accompanying drawing and the following description thereof will serve to illustrate diagrammatically how the present system operates to effect the controlled discharge of small quantities of solids material, as well as set forth additional advantageous features in connection therewith.

FIGURE 1 of the drawing is a diagrammatic elevational view indicating a balance beam arrangement with a vibrating-feeder unit supported from one end thereof and a liquid container unit supported from the other end thereof, as well as means for discharging from the respective end units.

Figure 2:
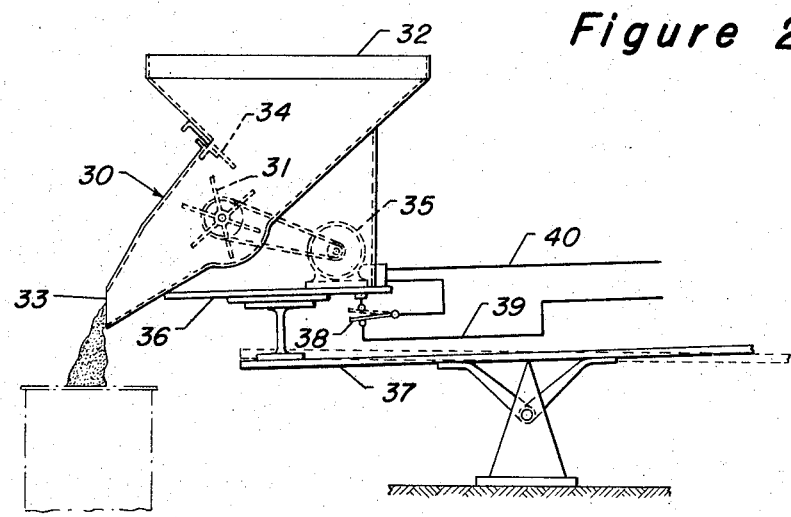

FIGURE 2 of the drawing also indicates in a diagrammatic manner a portion of the apparatus system, with a modified form of feeder unit to effect the solids discharge.

Referring now to FIGURE 1 of the drawing, there is indicated in a diagrammatic manner a balance beam 1 extending over a suitable fulcrum support means 2. A liquid container 3 is being supported from suitable deck means 4 at one end of the beam, while on the opposing end of the beam 1 there is a deck support 5 adapted to hold a vibrating table 6 and a superposed hopper means 7. The latter is indicated as being separately supported from the deck 5 by leg means 8 and, in addition, as having a lower spout 9 terminating a short distance above the upper surface of the vibrating table 6. The spacing between the two shall of course be such that there is no flow of particles from the hopper 7 except upon the operation of the vibrating unit 6 by power means 10. When the vibrating-feeder means is in operation there will be a continuous flow of subdivided particles 11 from the lower end of the vibrating table surface 6 such that the particles may be continuously discharged into a suitable mixer or reaction zone indicated by the dashed lines 12. The addition of granular solids material into the feed hopper 7 shall, in the present embodiment, be made at periodic intervals in given batches, such as from the drum means 13 indicated diagrammatically above hopper 7.

In connection with the liquid balancing and pumping system, there is shown a flexible tube member 14 connecting with an outlet means 15 from container 3 and a line 16 connecting with a variable discharge rate pump 17. In this instance, the latter discharges through line 18, with valve 19 and flow metering means 28 into a liquid reservoir chamber 20 which in turn is superposed above the open upper end of liquid container 3. Chamber 20 is calibrated or has gage means 29 such that there may be a check on the volume therein and a measure of flow rate therefrom. Thus, there may be provided means for effecting the periodic dumping of a given quantity of liquid 21 through line 22 and valve 23 into the balancing liquid container 3. In maintaining a continuous operation of the balancing-feeding system there will, of course, be the periodic simultaneous discharge of solids material 11 from supply means such as drum 13 along with the discharge of liquid 21 from reservoir 20 into container 3. Thus, there is a refilling of the latter and of the hopper 7 all within one short period of time to provide a minimization of any upset in the overall system and a maintenance of the normal uniform discharge of solids material from the feeder unit of the balancing system.

Various means may be utilized for triggering or actuating the vibrator unit 6; however, one preferred method utilizes an electrical switch operative from the balance beam 1 or from its deck means. In this instance, there is indicated a switch 24 which can be pushed into a closed position by an arm or rod 25 such that there is a closing of the circuit from the power supply lines 26 and 27 leading to the motor means 10. Thus, as long as there is a slightly greater weight provided on the vibrating-feeder end of the balance beam 1 so at to maintain closed the switch 24 there will be a continuous and gradual discharge of solids material 11 from the action of the vibrating-feeder unit.

During the usual operation of the unit, the valve 19 and variable speed pump 17 is adjusted to provide a predetermined liquid flow rate from container 13 and there is a resulting gradual lessening of weight in the container 3 on that end of the balance beam 1. With the reduced weight in 3, there is a slightly downward tipping of beam 1 at the feeder end of the unit and a closing of switch 24 so as to start the operation of vibrator 6 and a discharge of material 11. Also, in the operation the feeder must be set to discharge solids slightly faster than the desired rate so that the electrical switch will be the control. At such times as the weight of solids discharged becomes greater than the weight of liquid discharged by pump means 17, then there will be a greater weight exerted on the balance beam by the container 3 and its liquid 21 such that the vibrating-feeder end of the unit raises slightly to open switch 24 and stop the flow of solids material from the unit. Generally, it has been found that the present balancing system, utilizing a liquid pump-around arrangement for controlling feed, will effect an operation of the solids discharge about 90 percent of the time. In other words, the vibrating-feeder means is turned off for only about 10 percent of the time on a continuous operational basis.

When the solids material within hopper 7 approaches a low level and, at the same time, the liquid 21 is substantially discharged from the container 3, then there shall be performed the periodic refilling of the hopper means 7 in the manner heretofore described and at a simultaneous time, there will be the discharge of additional liquid 21 from reservoir 20 into container 3. These quantities should of course weigh the same so as to balance one another; however, after the operation has been initiated these quantities need not be preweighed, as the balance they are charged on will indicate equal weights before and after a recharge period. The method of replenishing hopper 7 and the container 3 is indicated as being from a manual operation; however, there can be suitable automatic feeder means to in turn effect the dumping of a given quantity of solid material into hopper 7 as well as liquid discharge means to effect the dumping of a given quantity and weight of liquid into container 3. For example, there may be counter balanced weighing type feeders for liquids as well as for solids, that embody a tripping mechanism along with a weighing means such that a predetermined desired quantity of a granular material and a predetermined equal weight of liquid may be periodically dumped into the system.

Referring now to FIGURE 2 of the drawing, there is shown a modified form of feeder unit 30 which is of the rotating paddle type (or "star" feeder type) having rotating blade means 31 adapted for constantly or intermittently moving particulated material from an upper hopper section 32 to outlet end 33. Flow can be regulated by means of an adjustable gate 34 from the hopper section 32 as well as by the motor drive means 35. The entire feeder unit is supported from deck means 36 on one end of a balance beam 37. A liquid container and pump discharge means may be used at the other end of balance beam in the manner of FIGURE 1 and is thus not repeated in the drawing.

Here again, the actuation of the feeder unit may be determined or controlled by switch means, such as 38, operative from the positioning of the balance beam 37. Switch 38 is shown closed so as to provide power from lines 39 and 40 as long as there is a slightly greater weight at the feeder end of the balance beam. However, as the weight of the feed from the unit 30 exceeds the weight of the liquid discharged at the other end of the balance beam and the deck 36 is raised slightly, then the switch 38 breaks the circuit and to stop and control particle flow from the feeder unit.

In still further optional arrangements, there may be other types or designs of rotating paddle feeders, as well as other mechanical feeders, including belt feeders, screw feeders, roll feeders and the like.

In order to illustrate how the present improved system may be utilized to advantageously feed small quantities of solids material, the following examples are set forth.

*Example I*

In one instance a vibrating-feeder unit having a hopper to hold approximately 1,000 pounds of solids material was used in combination with a commercially available Eriez feeder in an arrangement similar to FIGURE 1.

The feeder was utilized to continuously discharge small quantities of aluminum pellets which were of an irregular coin shape resulting from dropping hot molten aluminum into a liquid cooling bath and were of approximately ¼″ to ½″ diameter and ⅛″ high. The vibrator was set to deliver a sustained rate of pellets of about 20 pounds an hour when operating. Thus, the switch, such as 24, was controlling the on and off times of the vibrator and the desired rate of flow was accomplished. Water was used in the liquid container at the opposing end of the balance beam for use in the liquid pump-around system. Also, in this instance, the pump gradually removing water from the container was adjusted to provide the discharge of approximately 1 pound of pellets per hour from the feeder unit. By measuring the discharge quantities of both pellets and water from their respective ends of the balance beam system at 15 minute intervals there were found the following discharge rates: At the end of a first 15 minute interval, there were 65 cc. of water at 75° F. and 63 grams of aluminum pellets. In a second 15 minute interval, there were 61 cc. of water and 60.0 grams of aluminum. In a third interval there were 59 cc. of water and 59.0 grams of aluminum. In a fourth 15 minute interval there were 56 cc. of water and 58.4 grams of aluminum. Thus, the total water discharge from the liquid container was 241 cc. or an equivalent of 241 grams of water, and a total of 240.8 grams of aluminum pellets discharged from the vibrating-feeder end of the unit at the end of the one hour period. This operation indicated a quite accurate discharge of solids material responsive to a given flow rate from the liquid pump-around system, with the entire unit always in balance to within one or two aluminum pellets.

*Example II*

In an operation similar to that set forth for Eaxmple I, there was a slightly increased flow rate established in order to provide approximately 2 pounds per hour discharge of pellets from the vibrator-feeder unit. In carrying out this operation, there was a discharge of 221 cc. of water at the end of a first 30 minute interval and a discharge of 223 grams of aluminum pellets for the same interval. At the end of a second 30 minute interval there was a discharge of 225 cc. of water and 226 grams of aluminum pellets. Thus, in a one hour interval there was a total of 446 cc. of water or an equivalent of 446 grams thereof, while at the same time there was a substantially uniform discharge of aluminum pellets providing 449 grams thereof.

*Example III*

In still another test operation, utilizing the balance beam apparatus system described for the present invention and effecting the discharge of aluminum pellets as described for Examples I and II, there was an upward adjustment in the liquid pump-around rate to provide a solids discharge of approximately 3 pounds per hour. Again, obtaining discharge quantities for 15 minute intervals, there were 230 cc. of water discharged at 77° F. at the end of a 15 minute period and 230 grams of aluminum pellets discharged for the same period. In a second 15 minute interval, there were also 230 cc. of water discharged and 228.0 grams of aluminum pellets. At the end of a third 15 minute interval, there were 227 cc. of water discharged and 232.5 grams of pellets. At the end of a further 15 minute interval, there were 227 cc. of water and 227.0 grams of pellets discharged. Thus, there was a total of 914 cc. of water, or the substantial equivalent number grams, and a total of 917.5 grams of aluminum pellets showing again that there was a quite accurately controlled discharge of solid particles responsive to a continuous pump-around rate for liquid in the apparatus system.

It will be noted that water was utilized as the balancing liquid in connection with the foregoing examples and may well be used in many commercial operations for effecting the substantially continuous accurate discharge of small quantities of solid material; however, it is not intended to limit the present apparatus system to any one type of liquid. Many other liquids may be utilized, as for example, oils, glycols, and the like, which have a slower rate of evaporation and may thus provide for less liquid make-up over a long period of time to compensate for any evaporation losses. Further, it may be seen that the present type of apparatus is particularly adapted to effect the discharge of small quantities of solids material at rates of only a few pounds per hour although, of course, much higher rates may be accommodated. Actually, with suitable low feed rate feeder equipment in combination with the balancing beam arrangement providing for close control from a liquid pumping rate, there may be solids discharge rates of even less than one pound per hour.

The liquid being used for the control flow need not, of course, be recirculated in a closed system. The measured quantity of liquid from line 18, with flow meter 28, may be advantageously used in the same mixer or reactor receiving the solids material or, alternatively, the measured liquid may be discharged into another adjacent processing zone. In any case, in the present control system, it is not intended to limit the liquid flow to any one recirculation means or to discharge at any one zone.

We claim as our invention:

1. An apparatus system for discharging small quantities of granular solids material from a feed hopper by the use of a controlled liquid flow rate from a separate liquid container, comprising in combination, an electric power operated feeder means having a power supply line thereto and positioned in association with a superposed feed hopper having a reduced area lower particle outlet therefrom, a balance beam with a deck means at one end thereof holding said feeder means, an opposing deck means for said balance beam holding a liquid retaining container for in turn maintaining a balancing weight for the feeder means, a liquid flow line and adjustable liquid discharge means connecting with said container for removing liquid therefrom at a controlled rate, and actuator means for operating said feeder means that is positioned to be responsive to the balancing beam movement whereby said feeder means will remain operative responsive to a greater weight on the feeder side of said balance beam, said actuator means comprising an electrical switching means in said power supply line which is opened and closed responsive to slight up and down movements of said balance beam and the feeder means supported thereby.

2. The system of claim 1 further characterized in that said liquid discharge means is a variable speed positive displacement type pump providing variable controlled flow rates from said liquid container.

3. The system of claim 1 further characterized in that the feeder means is of the vibrating feeder type.

4. The system of claim 1 further characterized in that the feeder means is of the rotating paddle type.

5. The system of claim 1 further characterized in that a separate liquid reservoir chamber is provided to accumulate the liquid pumped from said container on said balance beam and valve controlled fluid transfer means is provided between the reservoir chamber and said balancing container whereby the same liquid is utilized in a recycling pump-around fluid section.

6. The system of claim 5 still further characterized in that periodic particle loading means is provided superposed above said feeder means and liquid flow from said reservoir is actuated simultaneously with the dumping of additional particles from said loading means to said feeder means.

7. An apparatus system for discharging small quantities of granular solids material from a feed hopper by the use of a controlled liquid flow rate from a separate liquid container, comprising in combination, a power operated vibrating feeder means positioned in association with a superposed feed hopper having a reduced area lower particle outlet therefrom, a balance beam with a deck means at one end thereof holding said feeder means, an opposing deck means for said balance beam holding a liquid retaining container for in turn maintaining a balancing weight for the vibrating feeder means, a liquid flow line and adjustable liquid discharge means connecting with said container for removing liquid therefrom at a controlled rate, and actuator means for operating said vibrating feeder means that is positioned to be responsive to the balancing beam movement whereby said vibrating feeder means will remain operative responsive to a greater weight on the feeder side of said balance beam.

8. The system of claim 7 further characterized in that said adjustable liquid discharge means includes a variable speed pumping means.

References Cited
UNITED STATES PATENTS

| | | |
|---|---|---|
| 1,940,946 | 12/1933 | Hamilton et al. |
| 2,416,994 | 3/1947 | Harper _____ 222—58 |

ROBERT B. REEVES, *Primary Examiner.*

STANLEY H. TOLLBERG, *Examiner.*